United States Patent [19]

White

[11] 3,816,374

[45] June 11, 1974

[54] POLYACETYLENES

[75] Inventor: Dwain M. White, Schenectady, N.Y.

[73] Assignee: General Electric Company, Schenectady, N.Y.

[22] Filed: Feb. 8, 1973

[21] Appl. No.: 330,497

Related U.S. Application Data

[63] Continuation-in-part of Ser. No. 118,467, Feb. 24, 1971, abandoned.

[52] U.S. Cl. ........................... 260/47 UA, 260/80.78
[51] Int. Cl. ............................................. C08f 23/00
[58] Field of Search ............................... 260/47 UA

[56] References Cited
UNITED STATES PATENTS
3,300,456  1/1967  Hay.................................. 260/88.2

FOREIGN PATENTS OR APPLICATIONS
1,149,697  4/1969  Great Britain ..................... 29/477

Primary Examiner—Melvin Goldstein
Attorney, Agent, or Firm—William A. Teoli; Joseph T. Cohen; Jerome C. Squillaro

[57]  ABSTRACT

Certain polyacetylenes are provided having chemically combined ether linkages, or alkylene linkages and mixtures thereof, exhibiting improved compatability with various organic plasticizers. The polyacetylenes have been found to be melt extrudable, and convertible to carbonaceous films and molded carbon objects.

6 Claims, No Drawings

POLYACETYLENES

This application is a continuation-in-part of application Ser. No. 118,467, filed Feb. 24, 1971 and now abandoned, and assigned to the same assignee as the present invention.

The present invention relates to certain polyacetylenes useful for making carbonaceous films and fibers.

Prior to the present invention, various attempts were made to carbonize numerous organic polymers in fibrous form having a high carbon content to provide for high strength graphite fibers. As shown in Johnson, et al., U.S. Pat. No. 3,412,062, for example, carbon fibers having a high tensile strength and Young's modulus can be made from polyacrylonitrile. Although desirable results can be achieved with polyacrylonitrile fibers, these fibers must be subjected to a preliminary oxidation treatment to stabilize the fibers prior to graphitization. Although the preoxidation treatment results in fiber stability, it also can result in considerable fiber weight loss and reduction in carbon values. It is generally known that polyacetylenes, for example, polymers shown by Hay U.S. Pat. Nos. 3,300,456; 3,332,916; 3,519,611, British Pat. No. 1,149,697, etc. can be converted to the carbonaceous state without significant reduction in weight or loss of carbon values. In order to convert such polyacetylenes to carbon and graphite fiber, it is necessary to produce a precursor fiber which can be carbonized. Direct heating of polyacetylenes to permit extrusion of polymer having been unsuccessful because the acetylenic bond can be activated at temperatures above 150° C. rendering the polymer intractable. Efforts utilizing various organic solvents as plasticizers often have been unsuccessful, due to such factors as plasticizer incompatibility, volatility, etc.

The present invention is based on the discovery that certain polyacetylenes defined hereinafter, exhibit optimum compatibility when employed with a variety of organic plasticizers, such as Arochlors, nitrobenzene to produce melt-extrudable blends. The melt-extrudable blends can be converted to polyacetylene fibers. These polyacetylene fibers can be converted to high strength graphite.

There is provided by the present invention polyacetylene terpolymers selected from the class consisting of A. terpolymers consisting essentially of
  a. 85 to 92 mole per cent of meta-diethynylbenzene units,
  b. 4 to 10 mole per cent of para-diethynylbenzene units,
  c. 2 to 6 mole per cent of bisphenol-A dipropargyl ether units, where the sum of (a), (b) and (c) units in (A) is 100 mole per cent, and
B. terpolymers consisting essentially of
  d. 74 to 86 mole per cent of meta-diethynylbenzene units,
  e. 4 to 9 mole per cent of para-diethynylbenzene units, and
  f. 5 to 15 mole per cent of diethynylalkane units, where the sum of (d), (e) and (f) units in (B) is 100 mole per cent, and
C. tetrapolymers consisting essentially of about 5 per cent by weight of acetylene units, and 95 per cent by weight of (A) or (B), based on the total weight of tetrapolymers.

The polyacetylene terpolymers of the present invention can be made by reacting ethynylarylene compounds such as mixtures of meta-diethynylbenzene with para-disthynylbenzene in combination with compounds such as dipropargyl ethers, diethynyl alkanes, and optionally with acetylene. The oxidative coupling reaction disclosed in Hay U.S. Pat. No. 3,300,456, assigned to the same assignee as the present invention can be empolyed. There is employed in the oxidative coupling reaction, which will be shown more specifically in the examples set forth later, a basic supric amine complex, and oxygen. A mixture, for example, a dihydric phenol can be empolyed with a diethynyl arylene mixture consisting for example, of meta-diethynylbenzene and paradiethynylbenzene and employed in an oxygenated solution with an oxidative coupling catalyst such as cuprous chloride, N, N, N', N'-tetramethylethylenediamine with an appropriate organic solvent such as dichlorobenzene and pyridine. Recovery of the terpolymer can be achieved by the addition of the reaction mixture to methanol containing a trace of hydrochloric acid. The resulting terpolymer can thereafter by washed by conventional means with a solvent such as methanol and thereafter dried. When employing dipropargyl ether units in the reaction mixture, there is produced "ether terpolymers" while "alkane terpolymers" can be made by using diethynyl alkane compounds such as 1,6-diethynylhexane, 1,4-diethylbutane, etc.

In order that those skilled in the art may be better able to practice the invention the following examples are given by way of illustration, and not by way of limitation. All parts are by weight.

Example 1

A terpolymer was made by employing dipropargyl ether of 2,2-bis(4-hydroxyphenyl)propane (bisphenol-A) (BPA), meta-diethynylbenzene (MDEB), and para-diethynylbenzene (PDEB) utilizing an oxidative coupling catalyst produced with cuprous chloride, N,N,N',N'-tetramethylethylenediamine, and a solvent system of pyridine and dichlorobenzene.

There was added a solution in about 25 parts of dichlorobenzene of 0.5 parts of the dipropargyl ether of BPA, 4.1 parts of MDEB, and 0.4 parts of PDEB to a mixture of 0.15 parts of cuprous chloride, about 0.18 parts of N,N,N',N'tetramethylethylenediamine dissolved in an oxygenated solution of about 1.7 parts of pyridines and 75 parts of ortho-dichlorobenzene at 60° C. The temperature of the mixture rose to 88.5° C. while it was stirred after about 2 minutes. The mixture also became too thick to stir. After 10 minutes the mixture was allowed to cool to room temperature, and added to excess methanol containing a trace of hydrocloric acid. There was obtained a quantitative yield of product having an intrinsic viscosity in ortho-dichlorobenzene at 120° C. of 0.77 dl/g. Based on method of preparation the product was a polyacetylene terpolymer having about 4 mole per cent dipropargyl bisphenol-A ether units, 9 mole per cent of PDEB units and 87 mole per cent of MDEB units.

Compatibility of the terpolymer was determined by forming a 2 per cent solution of the terpolymer in ortho-dichlorobenzene at temperatures of about 110° C. and allowing the solution to cool. If precipitation started to occur at 55° C. or above, that is, if the solution became hazy, then the terpolymer was considered incompatible. To undersirable consequences can result from incompatibility. First, a higher than normal extrusion temperature can be required. Second, low molecular weight polymer would likely form during oxidative coupling due to premature precipitation of polymer. Low molecular weight, i.e., an intrinsic viscosity below 0.5 dl/g in ortho-dichlorabenzene would not likely form satisfactory polyacetylene fiber convertible to high strength graphite.

The above solution terpolymer was found to be compatible since it became hazy at about 38° C. It also was found that the terpolymer resulted in less than 7 per cent loss by weight of carbon values based on the theoretical weight per cent of carbon, when the terpolymer was subsequently graphitized in fibrous form.

The terpolymer is blended with ortho-dichlorobenzene utilizing 2 parts of plasticizer, per part of terpolymer. The blend is extruded to produce 2 mil diameter extrudate. The extrudate is heated slowly to a temperature of 300° C. The resulting heat treated fiber is then stress graphitized at from 4,000 to 14,000 psi at temperatures up to 3,000° C. in an argon atmosphere. High strength graphite is obtained having a tensile of $330 \times 10^3$ psi.

Example 2

A solution of 0.5 parts of 1,7-octadiyne, 4.2 parts of MDEB and 0.3 parts of PDEB in 25 parts of orthodichlorobenzene was added to a solution of 0.15 parts of suprous chloride, about 0.23 parts of N,N,N',N'-tetramethyl-1,2-ethylene diamine and about 1.7 parts of pyridine, in about 75 parts of ortho-dichlorobenzene, which was being oxygenated and stirred at 62-½° C. The temperature of the mixture rose to about 88° C. within 2 minutes and then gradually dropped. The mixture was stirred for 60 minutes and then poured into about 500 parts of methanol containing a trace of hydrochloric acid. The product which precipitated was collected on a filter and washed with additional methanol and dried at 25° C. There was obtained a 99 per cent yield of product having an intrinsic viscosity of 0.50 dl/g at 120° C. Based on method of preparation, the product was polyacetylene terpolymer composed essentially of 12 mole per cent of octadiynyl units, 82 mole per cent of MDEB units, and 6 mole per cent of PDEB units.

Several additonal alkylene terpolymers were made following the same procedure to determine the optimum mole per cent ranges of ethynyl units for plasticizer compatibility, as determined in ortho-dichlorobenzene. It was found that optimum compatibility in ortho-dichlorobenzene based on the test of Example 1, was a terpolymer having 15 mole per cent of alkane diethynyl units, 76 mole per cent of MDEB units, and 8 mole per cent of PDEB units.

A weight loss of less than 5 per cent was experienced when the terpolymers were graphitized as described in Example 2. There was obtained high strength graphite fiber useful for making composites with epoxy resins.

Example 3

There was added a solution of 4.23 parts of MDEB, 0.27 part of PDEB, 0.50 part of the dipropargyl ether of BPA in ortho-dichlorobenzene to an oxygenated mixture of 0.15 part of cuprous chloride, 0.17 part of tetramethyl-ethylenediamine, about 1.7 part of pyridine, and approximately 60 parts of ortho-dichlorobenzene. Oxygenation of the mixture was achieved by bubbling oxygen into the solvent at a rate of about 0.5 cubic feet per hour, per mole of ethynyl compound. There was then bubbled into the mixture 0.28 part of acetylene over a 2 minute period. The reaction temperature rose steadily from an initial bath temperature of about 61° C. to about 80.5° C., and then gradually dropped. External heating was removed after about 6 minutes, after which time the oxygenation of the mixture was discontinued. The product began to precipitate upon cooling. The mixture was added to excess methanol acidified with hydrochloric acid to effect the precipitation of product. Recovery of the product was achieved by a standard extraction technique, followed by washing with methanol. Based on method of preparation, the product was a polyacetylene having about 95 per cent by weight of diethynyl units consisting of 4 mole per cent of chemically combined dipropargyl bisphenol-A ether units, 9 mole per cent of PDEB units, 87 mole per cent of MDEB units, and about 5 per cent by weight of additional acetylene units based on the weight of polyacetylene. The product had an intrinsic viscosity in dichlorobenzene at 120° C. of 1.12 dl/g. It did not precipitate from a 2 per cent solution in ortho-dichlorobenzene until cooled to 30° C.

Example 4

There was added a mixture of 8.58 g. of MDEB, 0.95 g. of PDEB, and 0.47 g. of dipropargyl ether of BPA in 16 ml of ortho-dichlorobenzene to an oxidative coupling catalyst reaction mixture of 100 ml. of ortho-dichlorobenzene, 3.4 ml. of pyridine, 0.46 ml. of N,N,-N',N'-tetramethyl-1,2-ethylenediamine, and 0.30 g. of cuprous chloride. During the addition of the aforementioned monomer solution, oxygen was bubbled into the mixture at a rate of 1 cubic foot per hour, while the temperature of the mixture was maintained at 60° C. with stirring.

The reaction temperature rose to 83° C. within 6 minutes and then gradually dropped. After 17 minutes the mixture was too viscous to stir. Thereupon, 75 ml. of hot ortho-dichlorobenzene was added to the mixture which was allowed to cool. Upon cooling the product precipitated which formed viscous slurry. It was poured into 1,400 ml. of methanol containing 15 ml. of concentrated hydrochloric acid. The product was filtered and stirred two additional times in methanol. The product was dried overnight under reduced pressure. There was obtained 9.41 g. of product. Based on method of preparation, the product was a polyacetylene terpolymer consisting of 88 mole per cent of MDEB units, 10 mole per cent of PDEB units and 2 mole per cent of dipropargyl ether units of BPAD. The above procedure was repeated to produce two additional polyacetylene terpolymers consisting of 91.3 mole per cent of MDEB units, 4.7 mole per cent of PDEB units, and 4 mole per cent of dipropargyl ether units of BPAD; 90 mole per cent of MDEB units, 4 mole per cent of PDEB units, and 6 mole per cent of dipropargyl ether units of BPAD, respectively. The haze temperature of the aforementioned polymer was determined in accordance with the procedure of Example 1, using a 2 per cent polymer solution in ortho-dichlorobenzene. It was found that the terpolymer having 2 mole per cent of BPAD dipropargyl ether units was 48° C. and the haze temperature of the terpolymers having 4 and 6 mole per cent of BPAD units respectively, was 49° C. It was also found that a terpolymer having as little as 85 mole per cent of MDEB units, 10 mole per cent of PDEB units, and 5 of BPAD, had a haze temperature of less than about 40° C. Copolymers of MDEB and PDEB free of BPAD units such as a 80 MDEB/20 PDEB copolymer blend were insoluble in orthodichlorobenzene even at 150° C. which is near the decomposition temperature of the polymer and a haze temperature could not be determined. It was also found that when the BPAD units and the terpolymer blend substantially exceeded 6 mole per cent such as 10 mole per cent, a dramatic increase in the weight loss of the polymer (12 per cent) was experienced when it was heated to a temperature of 900° C. at a rate of 10° per minute.

Although the above examples are limited to only a few of the very many terpolymers which are included within the scope of the present invention, it should be understood the terpolymers described prior to these examples, as well as recited in the claims, also fall within the scope of the invention.

What we claim as new and desire to secure by letters patent of the United States:

1. Polyacetylenes selected from the class consisting of
   A. terpolymers consisting essentially of
      a. 85 to 92 mole per cent of meta-diethynylbenzene units,
      b. 4 to 10 mole per cent of para-diethynylbenzene units,
      c. 2 to 6 mole per cent of bisphenol-A dipropargyl ether units, where the sum of (a), (b) and (c) units in said terpolymer is 100 mole per cent, and
   B. tetrapolymers consisting essentially of about 5 per cent by weight of acetylene units, and 95 per cent by weight of (A), based on the total weight of tetrapolymers.

2. A polyacetylene in accordance with claim 1 where the terpolymer consists of 88 mole per cent of meta-diethynylbenzene units, 10 mole per cent of para-diethynylbenzene units, and 2 mole per cent of bisphenol-A dipropargyl ether.

3. A polyacetylene in accordance with claim 1 where the terpolymer consists of 91.3 mole per cent of meta-diethynylbenzene units, 4.7 mole per cent of para-diethynylbenzene units, and 4 mole per cent of bisphenol-A dipropargyl ether.

4. A polyacetylene in accordance with claim 1 where the terpolymer consists of 90 mole per cent of meta-diethynylbenzene units, 4 mole per cent of para-diethynylbenzene units, and 6 mole per cent of bisphenol-A dipropargyl ether.

5. A polyacetylene in accordance with claim 1 consisting essentially of 87 mole per cent of meta-diethynylbenzene units, 9 mole per cent of para-diethynylbenzene units, and 4 mole per cent of bisphenol-A dipropargyl ether.

6. A tetrapolymer in accordance with claim 1 consisting essentially of about 5 per cent by weight of acetylene units chemically combined with about 95 per cent by weight of diethynyl units consisting of 4 mole per cent of chemically combined bisphenol-A dipropargyl ether, 9 mole per cent of para-diethynylbenzene, and 87 mole per cent of meta-diethynylbenzene.

* * * * *